(12) United States Patent
Kim

(10) Patent No.: US 10,070,133 B2
(45) Date of Patent: Sep. 4, 2018

(54) METHODS, APPARATUSES, SYSTEMS, AND NON-TRANSITORY COMPUTER READABLE MEDIA FOR IMPROVING AND/OR OPTIMIZING IMAGE COMPRESSION QUALITY

(71) Applicant: NAVER Corporation, Seongnam-si, Gyeonggi-do (KR)

(72) Inventor: Seungjin Kim, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 58 days.

(21) Appl. No.: 15/150,868

(22) Filed: May 10, 2016

(65) Prior Publication Data
US 2017/0195674 A1 Jul. 6, 2017

(30) Foreign Application Priority Data
Dec. 31, 2015 (KR) ........................ 10-2015-0190859

(51) Int. Cl.
*H04N 19/91* (2014.01)
*H04N 19/172* (2014.01)
(Continued)

(52) U.S. Cl.
CPC ......... *H04N 19/136* (2014.11); *H04N 19/115* (2014.11); *H04N 19/154* (2014.11); (Continued)

(58) Field of Classification Search
None
See application file for complete search history.

(56) References Cited

U.S. PATENT DOCUMENTS 5,467,134 A * 11/1995 Laney ................. H04N 9/8045
348/409.1
6,693,961 B1 * 2/2004 Azadegan ............ H04N 19/176
348/398.1
(Continued)

FOREIGN PATENT DOCUMENTS

JP 2012178736 A 9/2012
KR 2002-0035726 A 5/2002

OTHER PUBLICATIONS

Deshpande, Renuka G., and Lata L. Ragha. "Performance analysis of various video compression standards." Global Trends in Signal Processing, Information Computing and Communication (ICGTSPICC), 2016 International Conference on. IEEE, 2016.*
(Continued)

*Primary Examiner* — Michelle M Entezari
(74) *Attorney, Agent, or Firm* — Harness, Dickey & Pierce, P.L.C.

(57) ABSTRACT

Disclosed are methods, apparatuses, systems, and/or non-transitory computer readable media for improving/optimizing image compression quality settings. A method of compressing an input image, using at least one processor, includes verifying a desired compression quality value desired for compressing the input image, determining an optimal image quality value that corresponds to a target peak signal-to-noise ratio (PSNR) from a set image quality range based on the desired compression quality value, and outputting an image file encoded at the optimal image quality value as a compressed file of the input image.

18 Claims, 14 Drawing Sheets

(51) Int. Cl.
  *H04N 19/136* (2014.01)
  *H04N 19/44* (2014.01)
  *H04N 19/115* (2014.01)
  *H04N 19/154* (2014.01)

(52) U.S. Cl.
  CPC .......... *H04N 19/172* (2014.11); *H04N 19/44* (2014.11); *H04N 19/91* (2014.11)

(56) References Cited

U.S. PATENT DOCUMENTS

| | | | | |
|---|---|---|---|---|
| 8,270,739 | B2* | 9/2012 | Coulombe | G06T 9/004 |
| | | | | 382/232 |
| 9,591,316 | B2* | 3/2017 | Bar Bracha | H04N 19/36 |
| 2007/0019873 | A1* | 1/2007 | Tzannes | G06T 9/00 |
| | | | | 382/239 |
| 2009/0110063 | A1* | 4/2009 | Nakayama | H04N 19/176 |
| | | | | 375/240.03 |
| 2009/0202001 | A1* | 8/2009 | Mitasaki | H04N 19/172 |
| | | | | 375/240.29 |
| 2013/0212440 | A1* | 8/2013 | Rom | G06F 11/0709 |
| | | | | 714/47.1 |
| 2015/0130965 | A1* | 5/2015 | Oishi | H04N 19/124 |
| | | | | 348/223.1 |
| 2015/0304661 | A1* | 10/2015 | Tzannes | G06T 9/00 |
| | | | | 382/239 |

OTHER PUBLICATIONS

Gorley, Paul, and Nick Holliman. "Stereoscopic image quality metrics and compression." Stereoscopic Displays and Applications XIX. vol. 6803. International Society for Optics and Photonics, 2008.*

Prashanth, H. S., H. L. Shashidhara, and Balasubramanya Murthy KN. "Image scaling comparison using universal image quality index." Advances in Computing, Control, & Telecommunication Technologies, 2009. ACT'09. International Conference on. IEEE, 2009.*

Rani, Bhawna, R. K. Bansal, and Savina Bansal. "Comparison of JPEG and SPIHT image compression algorithms using objective quality measures." Multimedia, Signal Processing and Communication Technologies, 2009. IMPACT'09. International. IEEE, 2009.*

Vijilin, Baby, and R. Shreelekshmi. "Quality enhancement of adaptively compressed images using bit plane removal." Computational Systems and Communications (ICCSC), 2014 First International Conference on. IEEE, 2014.*

De Vito, Fabio, et al., "PSNR Control for GOP-level Constant Quality in H.264 Video Coding," IEEE International Symposium on Signal Processing and Information Technology, 2005, pp. 612-617.

Korean Office Action dated Dec. 21, 2016 for corresponding Korean Patent Application No. 10-2015-0190859.

* cited by examiner

62(Min)  94(Max)

FIG. 6
<Step1>
target PSNR : 45.2
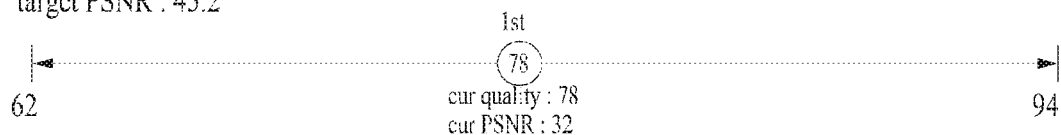
<Step2>
target PSNR : 45.2
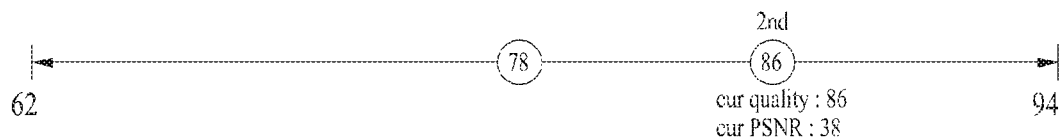
<Step3>
target PSNR : 45.2
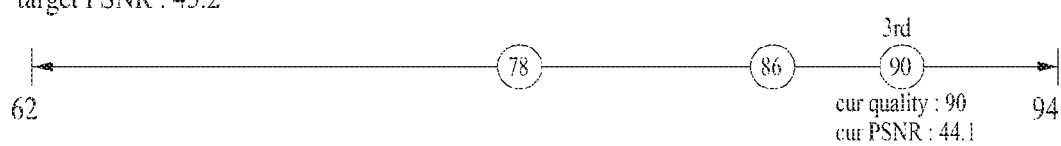
<Step4>
target PSNR : 45.2
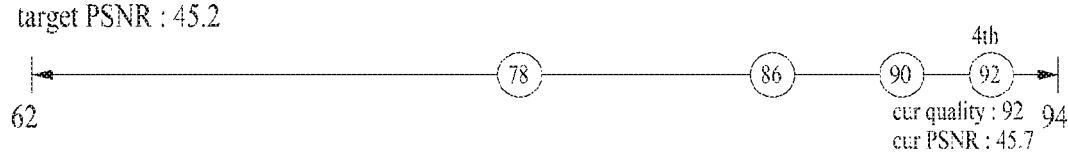

FIG. 8
<Step1>
target PSNR : 45.2
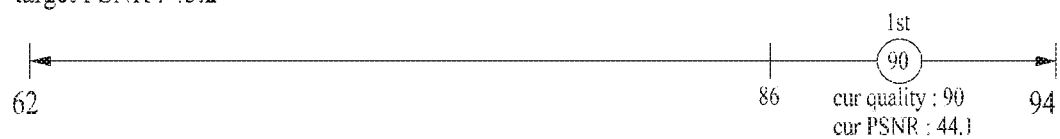
62    86    cur quality : 90    94
             cur PSNR : 44.1
<Step2>
target PSNR : 45.2
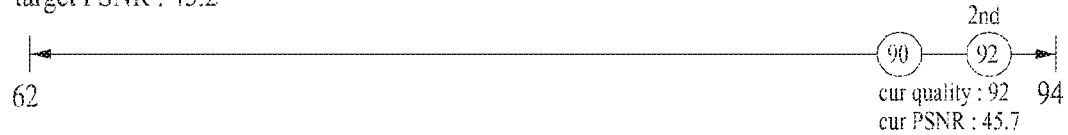
62         cur quality : 92    94
           cur PSNR : 45.7

METHODS, APPARATUSES, SYSTEMS, AND NON-TRANSITORY COMPUTER READABLE MEDIA FOR IMPROVING AND/OR OPTIMIZING IMAGE COMPRESSION QUALITY

CROSS-REFERENCE TO RELATED APPLICATION

This application claims the benefit of priority under 35 U.S.C. § 119 to Korean Patent Application No. 10-2015-0190859, filed on Dec. 31, 2015, in the Korean Intellectual Property Office (KIPO), the entire contents of which are incorporated herein by reference.

BACKGROUND

Field

One or more example embodiments relate to technology for compressing a digital image.

Description of Related Art

A digital image may be a color image or a black-and-white image represented using an infinite digital value set, such as a pixel element or a pixel. The digital image may represent a still image, or a picture image, and may also represent a video image that is a sequence of still images that are displayed in a manner that creates the illusion of motion. Image compression is the technique of applying data compression to digital images.

In general, conventional image compression techniques may be "lossless" or "lossy" depending on whether data is discarded during the image compression process. Examples of the conventional lossless compression technique may include a Huffman encoding technique, an arithmetic encoding technique, and a Fano-Shannon encoding technique. In the lossless compression technique, a decompression process reproduces a complete original image. On the contrary, the lossy compression technique discards a certain amount of data and thus, may provide a further efficiency when compared to the lossless compression technique in terms of processing speed and amount of storage size saved. The lossy compression technique is widely used for video or common image processing. The Joint Photographic Experts Group (JPEG) compression method and the Motion Picture Experts Group (MPEG) compression method are examples of widely used lossy image compression standards.

The JPEG compression method is employed to compress a still image and to transmit a video between users using a video call phone over a public telephone line network of which a transmission band is limited.

In the related art, when compressing a digital image, encoding is performed based on an image quality setting. For example, the digital image is encoded at a user required quality, for example, high, average, low, 88, 90, 92, and the like.

When encoding the digital image based on the image quality setting, raw data that has not been encoded may be encoded to be similar to original data according to an increase in the image quality setting. However, in the case of data having been encoded once or more, only the file size may increase and the further excellent image quality of data may not be guaranteed even after increasing the image quality setting.

SUMMARY

One or more example embodiments provide an image compression quality improvement and/or optimization methods, apparatuses, systems, and/or non-transitory computer readable media that may simultaneously satisfy an image compression quality setting and reduce the file size when compressing an image file.

One or more example embodiments also provide an image compression quality improvement and/or optimization methods, apparatuses, systems, and/or non-transitory computer readable media that may optimize the image quality desired and/or required for a digital image based on a peak signal-to-noise ratio (PSNR).

One or more example embodiments also provide an image compression quality improvement and/or optimization methods, apparatuses, systems, and/or non-transitory computer readable media that may find an image quality value that satisfies a target peak signal-to-noise ratio (PSNR) within an image quality range similar to a required image quality.

One or more example embodiments also provide an image compression quality improvement and/or optimization methods, apparatuses, systems, and/or non-transitory computer readable media that may enhance a processing rate by removing an iterative operation during an encoding process of finding an improved and/or optimal quality.

According to an aspect of the example embodiments, there is provided a method of compressing an input image, using at least one processor, the method including verifying, using the at least one processor, a desired compression quality value for compressing the input image, determining, using the at least one processor, an optimal image quality value corresponding to a target peak signal-to-noise ratio (PSNR) from an image quality range based on the desired compression quality value, and outputting, using the at least one processor, an image file encoded at the determined optimal image quality value as a compressed file of the input image.

A maximum value of the image quality range may be set as the desired compression quality value.

A maximum value of the image quality range may be set as the desired compression quality value, and a minimum value of the image quality range may be set as an image quality value that is at least a factor of two lower than the desired compression quality value.

A maximum value of the image quality range may be set as the desired compression quality value, and a minimum value of the image quality range may be set based on an average value determined using a plurality of optimal image quality values associated with a plurality of other images.

The determining of the optimal image quality value may include determining the optimal image quality value through a binary search on the image quality range.

The target PSNR may be set as a numerical value. The determining of the optimal image quality value may include encoding the input image using at least one of a plurality of quality values corresponding to the image quality range, extracting a PSNR from each of the at least one encoded images, and determining, as the optimal image quality value, the quality value associated with the extracted PSNR that is greater than, or equal to, the target PSNR.

The target PSNR may be set as a numerical range. The determining of the optimal image quality value may include encoding the input image using at least one of a plurality of quality values corresponding to the image quality range, extracting a PSNR from each of the at least one encoded images, and determining, as the optimal image quality value, the quality value associated with the extracted PSNR that corresponds to the target PSNR numerical range.

The determining of the optimal image quality value may include encoding the input image at a maximum value of the image quality range, decoding the image encoded at the maximum value, calculating an average value of the image quality range based on the maximum value and a minimum value of the image quality range, encoding the input image at the average value, decoding the image encoded at the average value, extracting a PSNR from the decoded image encoded at the maximum value and the decoded image encoded at the average value, and determining whether the average value is the optimal image quality value based on whether the extracted PSNR is greater than, or equal to, the target PSNR.

The determining of the optimal image quality value may further include changing the minimum value of the image quality range to the average value, determining whether the extracted PSNR is less than the target PSNR, and based on the results of the determining, calculating an updated average value of the image quality range based on the maximum value and the changed minimum value of the image quality range, encoding the input image at the updated average value, decoding the image encoded at the updated average value, and extracting an updated PSNR from the decoded image encoded at the maximum value and the decoded image encoded at the updated average value.

The method may further include iteratively calculating, using the at least one processor, whether repeating at least one of the encoding the input image, extracting the PSNR from the at least one encoded images, and the determining the quality value associated with the extracted PSNR, provides a result which is equal to the result a previous encoding. The determining of the optimal image quality value may include iteratively performing one or more of the encoding the input image, the extracting the PSNR from the at least one encoded images, and the determining the quality value associated with the extracted PSNR, based on the results of the calculating.

The determining of the optimal image quality value may include iteratively performing one or more of the encoding the input image using at least one of a plurality of quality values corresponding to the image quality range, the extracting the PSNR from the at least one encoded images, and the determining the quality value associated with the extracted PSNR.

According to another aspect, there is provided a non-transitory computer-readable recording medium storing computer-executable instructions, which when executed by at least one processor, causes the at least one processor to perform a method including verifying a desired compression quality value for compressing an input image, determining an optimal image quality value corresponding to a target peak signal-to-noise ratio (PSNR) from an image quality range based on the desired compression quality value, and outputting an image file encoded at the determined optimal image quality value as a compressed file of the input image.

According to another aspect, there is provided a system including a memory having computer readable instructions stored thereon, at least one processor configured to execute the computer readable instructions to verify a desired compression quality value required for compressing an input image, determine an optimal image quality value that satisfies a target peak signal-to-noise ratio (PSNR) from a set image quality range based on the desired compression quality value, and output an image file encoded at the optimal image quality value as a compressed file of the input image.

A maximum value of the image quality range may be set as the desired compression quality value, and a minimum value of the image quality range may be set as an image quality value that is at least a factor of two lower than the desired compression quality value.

The at least one processor may be further configured to determine the optimal image quality value through a binary search on the image quality range.

The at least one processor may be further configured to process a process of encoding the input image at each of at least a portion of quality values corresponding to the quality range and extracting a PSNR from each of encoded images, and a process of determining, as the optimal quality, a quality value at which the extracted PSNR corresponds to a numerical value or a numerical range corresponding to the target PSNR, among at least a portion of the quality values.

The at least one processor may be further configured to encode the input image using at least one of a plurality of quality values corresponding to the image quality range, extract a PSNR from each of the at least one encoded images, and determine, as the optimal image quality value, the quality value associated with the extracted PSNR that corresponds to a numerical value or a numerical range corresponding to the target PSNR.

The at least one processor may be further configured to encode the input image at a maximum value of the image quality range, decode the image encoded at the maximum value, calculate an average value of the image quality range based on the maximum value and a minimum value of the image quality range, encode the input image at the average value, decode the image encoded at the average value, extract a PSNR from the decoded image encoded at the maximum value and the decoded image encoded at the average value, and determine whether the average value is the optimal image quality value based on whether the extracted PSNR is greater than, or equal to, the target PSNR.

The at least one processor may be further configured to change the minimum value of the image quality range to the average value, determine whether the extracted PSNR is less than the target PSNR, and based on the results of the determining, calculate an updated average value of the image quality range based on the maximum value and the changed minimum value of the image quality range, encode the input image at the updated average value, decode the image encoded at the updated average value, and extract an updated PSNR from the decoded image encoded at the maximum value and the decoded image encoded at the updated average value.

The at least one processor may be further configured to iteratively calculate whether repeating at least one of the encoding the input image, extracting the PSNR from the at least one encoded images, and the determining the quality value associated with the extracted PSNR, provides a result which is equal to the result of a previous encoding. The determining of the optimal image quality value may include iteratively performing one or more of the encoding the input image, the extracting the PSNR from the at least one encoded images, and the determining the quality value associated with the extracted PSNR, based on the results of the calculating.

According to another aspect, there is provided an apparatus including a memory having computer readable instructions stored thereon, and at least one processor configured to execute the computer readable instructions to receive an input image to be compressed according to a desired compression quality setting, determine a target peak signal-to-noise ratio (PSNR) to use for encoding the input image based on a PSNR corresponding to the desired compression quality setting, set an image quality value range, the image quality value range including a high range value and a low range value, encode the input image using the high range value as a first encoded image, extract a first PSNR from the first encoded image, calculate an improved compression quality setting based on the image quality value range and the first PSNR, and convert the input image to a compressed image using the calculated improved compression quality setting.

The setting the image quality value range may include setting the high range value to the desired compression quality setting, and setting the low range value to at least one of an experimentally determined value or an average value determined based on compression of other input images.

The calculating the improved compression quality setting may include calculating an average value of the image quality value range, and setting the calculated improved compression quality setting to the calculated average value based on a comparison of the calculated average value and the low range value.

When the result of the comparison of the calculated average value and the low range value indicates that the calculating average value is not the low range value, the calculating the improved compression quality setting may include encoding the input image at the calculated average value as a second encoded image, extracting a second PSNR from the second encoded image, and determining whether to modify the high range value and the low range value and recalculate the improved compression quality setting based on a comparison of the extracted second PSNR and the target PSNR.

According to at least one example embodiment, there may be provided an image compression technology capable of encoding a digital image based on a PSNR, instead of encoding the digital image based on a quality required for the digital image.

Also, according to at least one example embodiment, it is possible to simultaneously satisfy an image compression quality and to reduce a file size by optimizing a quality required for a digital image based on a PSNR and by compressing the digital image at an optimal quality.

Also, according to at least one example embodiment, it is possible to reduce the number of encodings for finding an optimal quality by finding a quality value that satisfies a target PSNR within the quality range similar to a required quality.

Also, according to at least one example embodiment, it is possible to enhance a quality optimization rate by removing an unnecessary operation or an iterative operation during an encoding process for finding an optimal quality.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIGS. 5 through 8 illustrate examples of a process of finding an optimal quality that satisfies a target peak signal-to-noise ratio (PSNR) according to at least one example embodiment.

Figure 1:
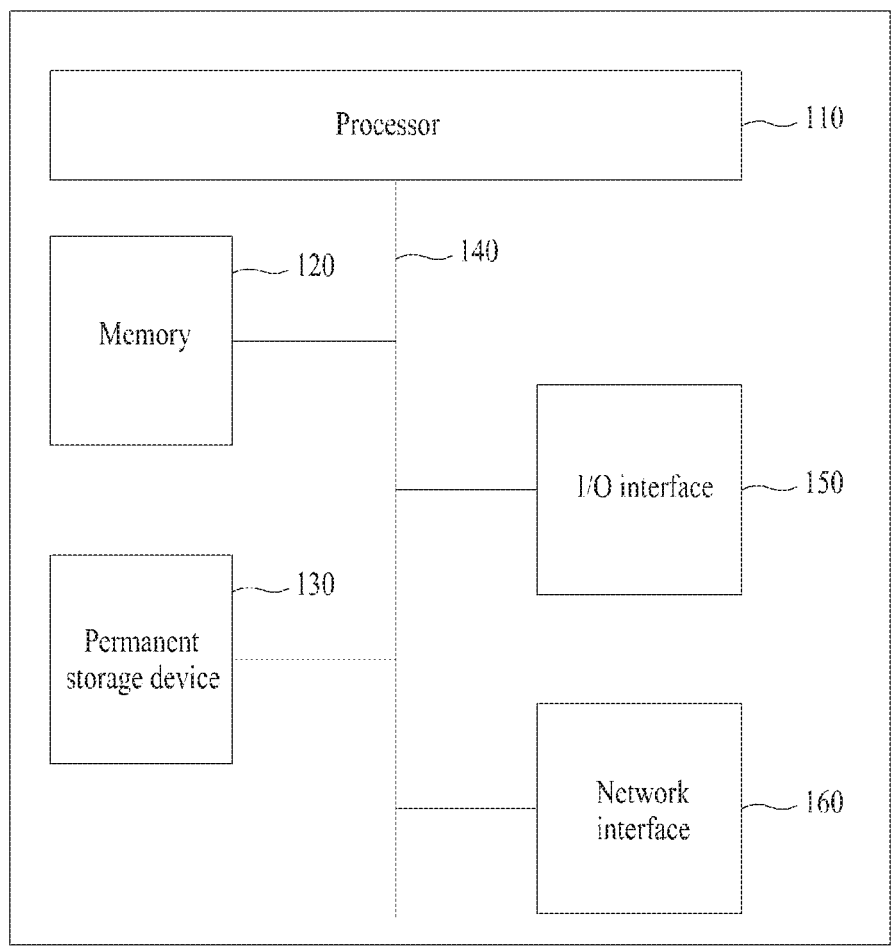
FIG. 1 is a block diagram illustrating an example of a configuration of a computer system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Hereinafter, one or more example embodiments will be described with reference to the accompanying drawings.

The example embodiments relate to methods, apparatuses, systems, and/or non-transitory computer readable media for compressing an image file, and more particularly, to performance improvement/optimization technology for reducing a file size by improving and/or optimizing an image compression quality.

The example embodiments disclosed herein may improve and/or optimize the image compression quality and may achieve advantages in terms of decreased file sizes, improved processing efficiency, improved processing rate, and the like as will be appreciated by one of ordinary skill in the art.

An image to be applied with data compression (e.g., an image to be compressed) is a digital image expressed using an infinite digital value set, such as a picture element, a pixel, etc. In addition to a still image, such as a picture, any type of image, such as a frame of a video and the like, may be included as a target image.

A Joint Photographic Experts Group (JPEG) format is frequently used to store and transmit images on computer environments and computer networks, such as the Internet. Other image formats, such as portable network graphics (PNG), graphic interchange format (GIF), tagged image file format (TFF), and the like, are widely used on the Internet.

JPEG is regarded as a lossy compression method, whereas PNG and GIF are examples of lossless compression methods. TIFF may use the lossy compression method or the lossless compression method depending on the situation.

Hereinafter, a lossy compression method using JPEG format compression will be described as a representative example. However, it is only an example and, without being limited thereto, other compression formats may be used in connection with various example embodiments for improving and/or optimizing image compression quality.

Figure 2:
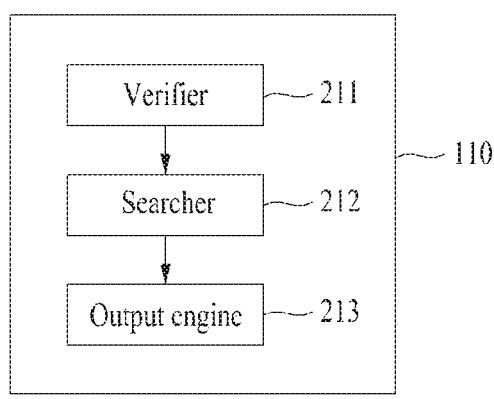
FIG. 2 is a block diagram illustrating an example of a constituent element includable in a processor of a computer system according to at least one example embodiment.

FIGS. 1 and 2 illustrate examples of a system according to at least one example embodiment, and FIGS. 3 through 14 illustrate various examples of a lossy compression method using the JPEG format compression according to at least one example embodiment.

FIG. 1 is a block diagram illustrating an example of a computer system according to at least one example embodiment. FIG. 1 illustrates a computer system 100 configurable according to at least one example embodiment described with reference to FIGS. 3 through 14.

Referring to FIG. 1, the computer system 100 includes at least one processor 110 that may include a computer or an electronic processor configured to execute computer readable instructions and to process information, including pixel information.

The processor 110 is a device capable of processing a sequence of instructions or a part of the device. For example, the processor 110 may be, for example, a computer processor and/or computer processor core, a processor within a mobile device or another electronic device, a digital processor, a plurality of interconnected processors (and/or processor cores), a plurality of distributed processors (and/or processor cores), a cloud processing system, etc. The processor 110 may be included in, for example, a personal computer, a mobile computing device, a smartphone, a tablet, a set-top box, an entertainment platform, a gaming console, a server, a camera or other image capturing device, a server farm, a cloud computer, and the like. The processor 110 may be connected to a memory 120 through a bus 140.

The memory 120 may include a volatile memory, a non-volatile memory, a permanent memory, a virtual memory, and/or other type of memory that is used by the computer system 100 to store information, data, and instructions transmitted to and from the computer system 100. The memory 120 may include, for example, a random access memory (RAM), a dynamic RAM (DRAM), static RAM (SRAM), L1 cache memory, L2 cache memory, electrically erasable programmable read-only memory (EEPROM), flash memory, magnetic RAM (MRAM), spin-transfer torque MRAM, ferroelectric RAM (FeRAM), phase-change RAM (PRAM), or resistive RAM, a three-dimensional (3D) memory array, etc. The memory 120 may be used to store information, data, and/or computer readable instructions, such as state information of the computer system 100. For example, the memory 120 may be used to store computer readable instructions of the computer system 100 that include computer readable instructions related to an image processing module for image compression.

The bus 140 is a communication-based structure that enables interaction between various components of the computer system 100. The bus 140 may deliver data between components of the computer system 100, for example, between the processor 110 and the memory 120. The bus 140 may include wireless and/or wired communication media between components of the computer system 100, and may include parallel, serial, or other data transfer topology arrangements.

A permanent storage device 130 may include components, such as another permanent storage device or a memory as used by the computer system 100 to store data during a desired (or alternatively predetermined) extended period of time compared to the memory 120. The permanent storage device 130 may include a non-volatile main memory as used by the processor 110 of the computer system 100. The permanent storage device 130 may include, for example, a flash memory, a hard disk, a solid state drive, an optical disc drive, and/or other computer readable recording media. The permanent storage device 130 may also be implemented as a network storage device, communicable over a network interface, such as a cloud storage network, distributed computing network, etc.

An input/output (I/O) interface 150 may include a keyboard, a mouse, a voice command input, a touchscreen, a stylus, a display panel, and/or an interface for other input or output device. Configuration instructions and/or images to be compressed may be received through the I/O interface 150.

A network interface 160 may include at least one interface for at least one network, such as a local area network (LAN), a wide area network (WAN), a metropolitan area network (MAN), a personal area network (PAN), an integrated service digital network (ISDN), an intranet, the Internet, a wireless LAN, a code division multiple access (CDMA), a Global System for Mobile Communications (GSM), a Bluetooth network, a satellite network, a radio network, a near-field communication (NFC) network, etc., but is not limited thereto. The network interface 160 may include interfaces for wired/wireless connections. Configuration instructions, data, and/or images to be compressed may be received through the network interface 160.

Figure 3:
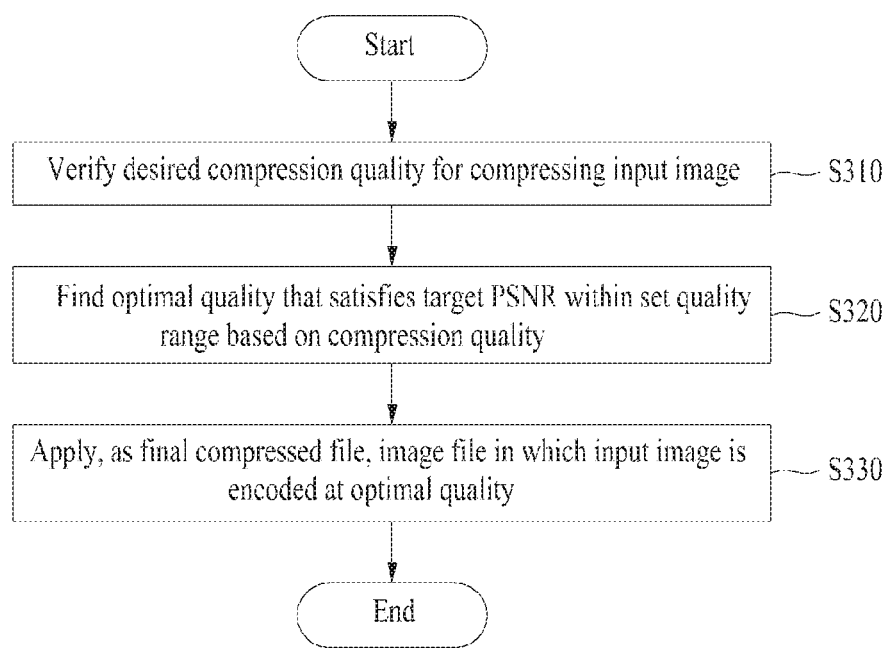
FIG. 3 is a flowchart illustrating an image compression method through quality optimization according to at least one example embodiment.

FIG. 2 is a block diagram illustrating an example of constituent elements included in the processor 110 of the computer system 100, which transforms the processor 110 into a special purpose processor, according to at least one example embodiment. FIG. 3 is a flowchart illustrating an image compression method performed by the computer system 100 according to at least one example embodiment.

Referring to FIG. 2, the processor 110 may include a verifier 211, a searcher 212, and an output engine 213. The constituent elements of the processor 110 may control the computer system 100 to perform special purpose operations S310 through S330 included in the image compression method of FIG. 3. To this end, the constituent elements may also be configured to execute an operating system (OS) included in the memory 120 and at least one program code.

Regarding the image compression method illustrated in FIG. 3, the image compression method may be performed outside the illustrated order and some of the operations may be omitted from the compression method, or an additional process may be further included in the compression method, according to various example embodiments.

In operation S310, the verifier 211 verifies a compression quality (e.g., compression image quality value or setting) desired and/or required for compressing an input image. The input image may be a digital picture or other digital image.

The input image may be expressed as a logical array of pixels within a memory. Here, the compression quality may be a desired quality value (e.g., image quality value or setting) input by a user or preset quality value stored at a terminal and/or computer system used in the compression process to compress the input image. For the compression quality value, one or more levels of a plurality of compression quality levels, for example, high, middle, and low, may be input. Additionally, a compression ratio of a specific numerical value within the desired and/or preset numerical range, for example, within the range of 62 to 100 may be input as the compression quality. That is, the verifier 211 may verify the desired quality input by the user and/or the quality preset at the terminal and/or system in association with the input image.

In operation S320, the searcher 212 finds (e.g., calculates and/or determines) an improved and/or optimal quality that satisfies a target peak signal-to-noise ratio (PSNR) within the set quality range based on the compression quality value selected, as a process for improving and/or optimizing the compression quality desired/required for the input image. Instead of encoding the input image at the compression quality value verified in operation S310, the searcher 212 may find a quality value that is similar to the verified compression quality value, but has a PSNR that is greater than or equal to a target value to use when the system performs the encoding operation. The improved and/or optimal quality may be found within a quality range that is lower than the verified compression quality value. The target PSNR that is standard for finding the improved and/or optimal quality may be an experimentally determined value, and may be determined as a single specific numerical value, for example, 45.2, or may be determined as a specific numerical range, for example, 44 to 66. That is, if the target PSNR is set as the single specific numerical value, a quality value greater than or equal to the target PSNR may be determined as the desired improved and/or optimal quality value. If the target PSNR is set as the specific numerical range, a quality value belonging to the numerical range corresponding to the target PSNR may be determined as the desired improved and/or optimal quality value(s). In other words, if the target PSNR is set as the single specific numerical value, a quality value present within the desired and/or preset range from a numerical value corresponding to the target PSNR may be determined as the improved and/or optimal quality value. When determining the improved and/or optimal quality, any type of compression format (e.g., JPEG, etc.) capable of reducing (e.g., compressing) a file size and/or enhancing an encoding rate may be applicable in addition to the aforementioned compression formats. Although the target PSNR is set as the specific numerical value range, the example embodiments are not limited thereto and other values used for the aforementioned improved and/or optimal quality determining methods may achieve the same or similar results.

A PSNR denotes a power of noise over the maximum power of a signal and may be used to evaluate quality information. The PSNR may be used as an index indicating a similarity between two different images. The greater the PSNR the higher the similarity between the images.

For example, the PSNR may be defined as expressed by Equation 1.

$$\sum_{i=0}^{k-1} \sqrt{(y'(i)^2 - y''(i)^2)} \qquad \text{[Equation 1]}$$

In Equation 1, y' denotes a noise power ratio of an original image, y" denotes a noise power ratio of a comparative image, and k denotes an image width.

The PSNR may be an index meaningful when used to compare different images. However, when the PSNR is less than, or equal to, a desired level, a person may not be capable of identifying (e.g., visually perceiving) a difference between two images with their eyes. In this respect, the PSNR may not be the same index as a quality identifiable by the person. Accordingly, by determining a PSNR, that is, a target PSNR at which the person may not identify a difference in image quality with their eyes and by decreasing the compression quality desired and/or required for the input image to be a quality that satisfies the target PSNR, a file size may be reduced through quality improvement and/or optimization.

The target PSNR may be deduced and/or determined through various types of experiments, such as subjective evaluation under a controlled experiment condition, a quantitative evaluation using an image processing method, and the like, but are not limited thereto. As an example of the subjective evaluation, two or more images may be shown to users under the same experimental condition. The users may input subjective ratings about their impressions on any differences in image quality between the images. The quality difference between images may be measured by collecting the input subjective ratings using a standardized subjective evaluation method, for example, ITU-R, VQEG continuous quality evaluation, and the like, but are not limited thereto. As an example of the quantitative evaluation, an evaluation may be configured to acquire a quantitative image quality evaluation index. For example, the image quality difference between images may be measured by extracting a feature vectors related to various objective aspects of the images, such as a feature vector indicating a variation in brightness between two images, a feature vector indicating the high frequency information of the images, and the like.

Although the PSNR is used as an index for comparing the image quality, it is only an example and the example embodiments are not limited thereto. In addition to the PSNR, various types of comparative indices capable of finding the quality similar to the requested quality may be used.

In operation S320, the searcher 212 may successfully read a JPEG image, may perform re-encoding at each quality value within the set quality range based on the compression quality without performing image conversion, and may find an improved and/or optimal quality value that satisfies the target PSNR. A process of determining the image quality range for finding the improved and/or optimal quality and a process of finding the improved and/or optimal quality that satisfies the target PSNR within the quality range will be described below.

In operation S330, the output engine 213 may apply, as a final compressed file, an image file in which the input image is encoded at the improved and/or optimal quality found in operation S320, and may output the final compressed file. Since the input image is encoded by lowering the compression quality desired and/or required for the image quality to be the quality that satisfies the target PSNR, it is possible to acquire an image of similar visual quality to the compression quality desired and/or required for the input image, and at the same time, further reduce the file size of the compressed image.

The final compressed file may be transmitted, via network interface 160, to another computing device for further image processing, display, etc., or may be displayed on at least one display panel (internal or external) connected to the computer system 100 via the I/O interface 150.

Figure 4:
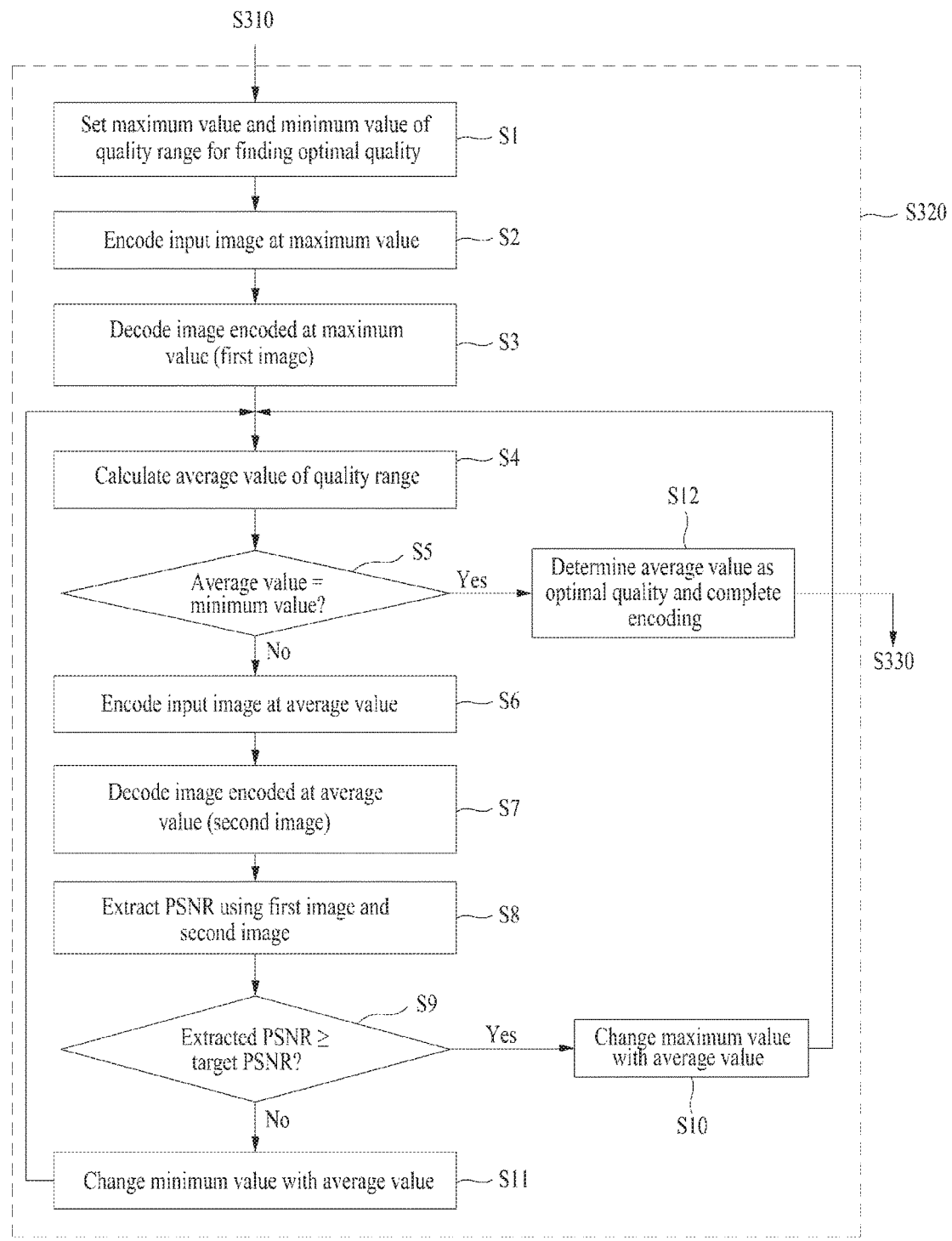
FIG. 4 is a flowchart illustrating a process of finding an optimal quality according to at least one example embodiment.

FIG. 4 is a flowchart illustrating an example of a quality search method according to at least one example embodiment. The quality search method (e.g., image quality search method) corresponds to operation S320 of the image compression method of FIG. 3. Each operation may be performed at the searcher 212 of FIG. 2. The quality search method be performed in an order different from the illustrated order, and some of the illustrated operations may be omitted, or additional operation may be further included, without deviating from the scope of the example embodiments.

In operation S1, the searcher 212 sets a maximum value and a minimum value of the quality range for finding the improved and/or optimal quality. The maximum value (e.g., high value) is set as the compression quality desired and/or required for the input image verified in operation S310. The minimum value (e.g., low value) is set as a quality value lower than the compression quality set as the maximum value. For example, a smallest value among quality values applicable to the image compression may be set as the minimum value of the quality range. When the quality range applicable to the image compression is 62 to 100 and a user desired and/or required quality is 94, the quality range for finding the improved and/or optimal quality may be set to be 62 to 94. As another example, the minimum value of the quality range may be set based on the experimentally determined similar quality range. When the improved and/or optimal quality is determined within "−4" units, for example, from the desired and/or required quality as many experimental results and the user desired and/or required quality is 94, the quality range for finding the improved and/or optimal quality may be set to be 90 to 94. As another example, the minimum value of the quality range may be set based on an average value determined using the improved and/or optimal quality of when compressing other images. As a further example, the minimum value of the quality range may be set as an exponentiation of a numeral value or a multiple of a numeral value for improving and/or optimizing a search section. For example, when the user desired and/or required quality is 94, the exponentiation of the numeral value may be set as "2" and, accordingly, the minimum value of the quality range may be set as "−2", "−4", "−8", etc., of the user desired and/or required quality. Thus, the quality range for finding the improved and/or optimal quality may be set to be 92 to 94, 90 to 94, 86 to 94, and the like. While various methods of determining the minimum value of the quality range are described above, the example embodiments are not limited thereto and other suitable methods may be used by the example embodiments.

In operation S2, the searcher 212 encodes the input image at the quality corresponding to the set maximum value of the quality range.

In operation S3, the searcher 212 decodes an image file encoded at the quality corresponding to the maximum value. Here, a decoding process is used to extract a PSNR.

In operation S4, the searcher 212 calculates an average value based on the currently set maximum value and minimum value of the quality range. A binary search may be applied as a process of finding the improved and/or optimal quality. To this end, the average value is calculated.

In operation S5, the searcher 212 determines whether the average value calculated in operation S4 is equal to the currently set minimum value of the quality range. That is, whether the currently set minimum value and maximum value are equal to each other is verified.

When the average value calculated in operation S4 is determined to be different from the currently set minimum value of the quality range in operation S5, the searcher 212 encodes the input image at the quality corresponding to the average value calculated in operation S4, in operation S6.

In operation S7, the searcher 212 decodes an image file encoded at the quality corresponding to the average value. A decoding process is used to extract a PSNR.

In operation S8, the searcher 212 extracts the PSNR using the image decoded in operation S3 and the image decoded in operation S7. The PSNR may be verified from Equation 1.

In operation S9, the searcher 212 determines whether the PSNR extracted in operation S8 is greater than or equal to a desired and/or preset target PSNR.

When the PSNR extracted in operation S8 is determined to be greater than or equal to the target PSNR in operation S9, the searcher 212 changes the maximum value of the quality range with the average value calculated in operation S4, in operation S10.

On the contrary, when the PSNR extracted in operation S8 is determined to be less than the target PSNR in operation S9, the searcher 212 changes the minimum value of the quality range with the average value calculated in operation S4, in operation S11.

By repeating operations S4 through S11, it is possible to perform encoding at the average value of the quality range and to find a quality value greater than or equal to the target PSNR.

When the average value of the quality range updated by repeating operations S4 through S11 is equal to the minimum value of the quality range, the searcher 212 determines the average value as the improved and/or optimal quality and completes encoding of the input image in operation S12. Here, the average value is equal to the minimum value indicates that the minimum value and the maximum value of the updated quality range are equal to each other.

Meanwhile, when a PSNR at a minimum value of the quality range is greater than or equal to the target PSNR by setting the quality range and by extracting the PSNR from the minimum value, the improved and/or optimal quality may be immediately determined as the corresponding minimum value. Accordingly, a quality search rate (e.g., image quality search rate) may be further enhanced. As another example, when the PSNR extracted in operation S8 is less than the target PSNR, the searcher 212 may change the minimum value of the quality range with the average value calculated in operation S4. When the PSNR is greater than or equal to the target PSNR by repeating operations S4 through S8, the searcher 212 may determine the average value calculated in operation S4 as the improved and/or optimal quality and may complete encoding of the input image.

Accordingly, it is possible to encode the input image at each of quality values corresponding to the quality range and to improve and/or optimize the compression quality desired and/or required for the input image using the quality that satisfies the target PSNR.

FIGS. 5 through 8 illustrate examples of a process of finding an improved and/or optimal quality that satisfies a target PSNR according to at least one example embodiment.

Figure 5:
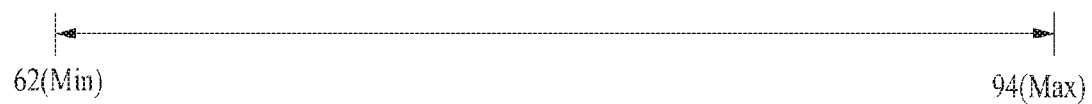
Figure 7:
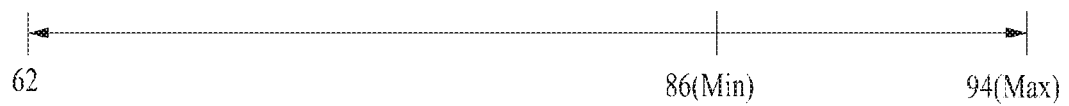

For example, referring to FIG. 5, when the quality range applicable to image compression is 62 to 100 and a user desired and/or required quality is 94, a maximum value of the quality range for finding the improved and/or optimal quality may be 94 and a minimum value of the quality range may be 62.

The improved and/or optimal quality that satisfies the target PSNR may be found from the quality range of 62 to 94. For example, the target PSNR is assumed as "45.2" as shown in FIG. 6.

In operation 1, a PSNR is extracted by encoding an input image at the quality of 78 corresponding to an average value of the quality range of 62 to 94 and decoding the input image. When the PSNR for the quality of 78 is 32, the PSNR is less than 45.2 that is the target PSNR. Thus, the minimum value of the quality range is updated with 78 and a quality search process continues.

In operation 2, a PSNR is extracted by encoding the input mage at the quality of 86 corresponding to an average value of the quality range of 78 to 94 and decoding the input image. When the PSNR for the quality of 86 is 38, the PSNR is less than 45.2 that is the target PSNR. Thus, the minimum value of the quality range is updated with 86 and the quality search process continues.

In operation 3, a PSNR is extracted by encoding the input image at the quality of 90 corresponding to an average value of the quality range of 86 to 94 and decoding the input image. When the PSNR for the quality of 90 is 44.1, the PSNR is less than 45.2 that is the target PSNR. Thus, the minimum value of the quality range is updated with 90 and the quality search process continues.

In operation 4, a PSNR is extracted by encoding the input mage at the quality of 92 corresponding to an average value of the quality range of 90 to 94 and decoding the input image. When the PSNR for the quality of 92 is 45.7, the PSNR is greater than 45.2 that is the target PSNR. Thus, the quality of 92 may be determined as the improved and/or optimal quality that is similar to 94 corresponding to the user desired and/or required quality and greater than or equal to 45.2 corresponding to the target PSNR. The quality search process and the encoding process are terminated.

Encoding is repeated to find the improved and/or optimal quality. There is a need to enhance the system performance by reducing the number of encodings. The minimum value of the quality range may be set as an exponentiation of a numerical value, such as "2," to improve and/or optimize the quality range for finding the improved and/or optimal quality. For example, referring to FIG. 7, when the quality range applicable to image compression is 62 to 100 and the user desired and/or required quality is 94, the quality range for finding the improved and/or optimal quality may be set to be 86 to 94 by setting the minimum value of the quality range as "−8" of the user desired and/or required quality.

A quality that satisfies the target PSNR may be found from the quality range of 86 to 94. For example, the target PSNR is assumed as 45.2 as shown in FIG. 8.

In operation 1, a PSNR is extracted by encoding the input image at the quality of 90 corresponding to an average value of the quality range of 86 to 94 and decoding the input image. When the PSNR for the quality of 90 is 44.1, the PSNR is less than 45.2 that is the target PSNR. Thus, a minimum value of the quality range is updated with 90 and a quality search process continues.

In operation 2, a PSNR is extracted by encoding the input mage at the quality of 92 corresponding to an average value of the quality range of 90 to 94 and decoding the input image. When the PSNR for the quality of 92 is 45.7, the PSNR is greater than 45.2 that is the target PSNR. Thus, the quality of 92 may be determined as the improved and/or optimal quality that is similar to 94 corresponding to the user desired and/or required quality and greater than or equal to 45.2 corresponding to the target PSNR. The quality search process and the encoding process are terminated.

Also, an initial search quality may be applied as the quality of −4 based on a user experiment regarding the quality search results that satisfies the target PSNR to improve and/or optimize the quality range for finding the improved and/or optimal quality. That is, when the user desired and/or required quality is 94, the improved and/or optimal quality may be found in order of initially finding the quality of 90 and then finding the quality of an average value of 90 to 94.

As described above, it is possible to reduce the number of encodings during a process of finding the improved and/or optimal quality that satisfies the target PSNR by improving and/or optimizing the quality range for finding the improved and/or optimal quality. Through this, it is possible to enhance the system performance.

Further, encoding is repeated during a process of finding the improved and/or optimal quality that satisfies the target PSNR. Here, when encoding is performed two or more times, an iterative or unnecessary operation may be removed. That is, when repeating an encoding process for finding the improved and/or optimal quality, a portion of operations having the same operation result as an operation result of a previous encoding process or an operation unnecessary for extracting the PSNR may be omitted from operations included in the encoding process.

Figure 9:
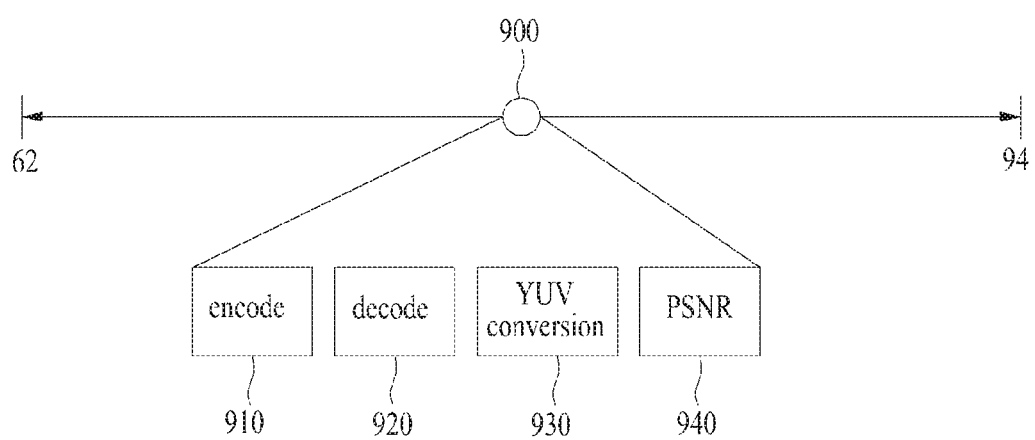
FIGS. 9 through 14 illustrate examples of an encoding process for quality optimization according to at least one example embodiment.

Referring to FIG. 9, a one-time encoding process 900 includes an encoding process 910 of converting a JPEG file to YCbCr, a decoding process 920 of converting a result value of the encoding process 910 to a red, green, blue (RGB) value, a YUV conversion process of converting a result value of the decoding process 920 to a YUV value, and a PSNR process 940 of extracting a PSNR using a result value of the YUV conversion process 930, according to at least one example embodiment, but the example embodiments are not limited thereto. In other words, an image encoding process may include a plurality of sub-image-processing operations, such as the YCbCr encoding process, the RGB decoding process, the YUV conversion process, and a PSNR extraction process, each of which would have been performed during the process of finding the improved and/or optimal quality that satisfies the target PSNR according to the example embodiments discussed in connection with FIGS. 3 to 8.

Figure 10:
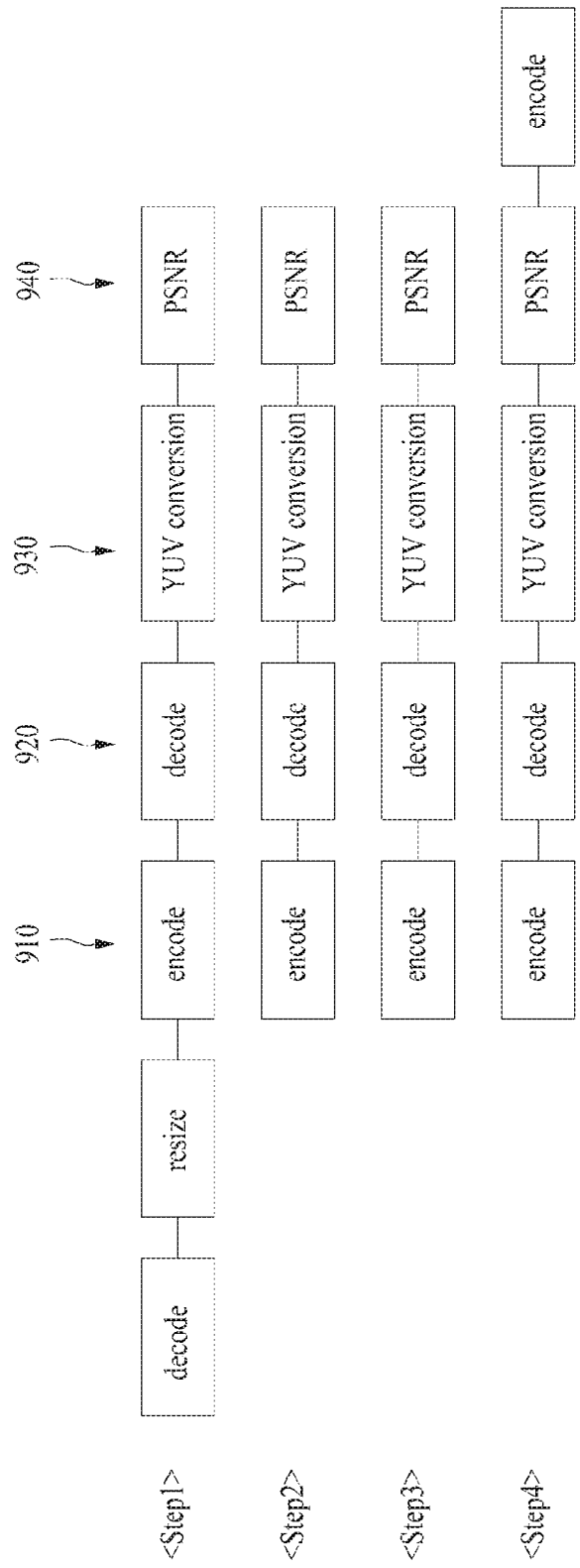

For example, when encoding is performed a total of four encodings (operation 1 through operation 4) as shown in FIG. 10 during a process of finding the improved and/or optimal quality that satisfies the target PSNR, each of the encoding process 910, the decoding process 920, the YUV conversion process 930, and the PSNR process 940 is performed with respect to the input image four times.

Figure 11:
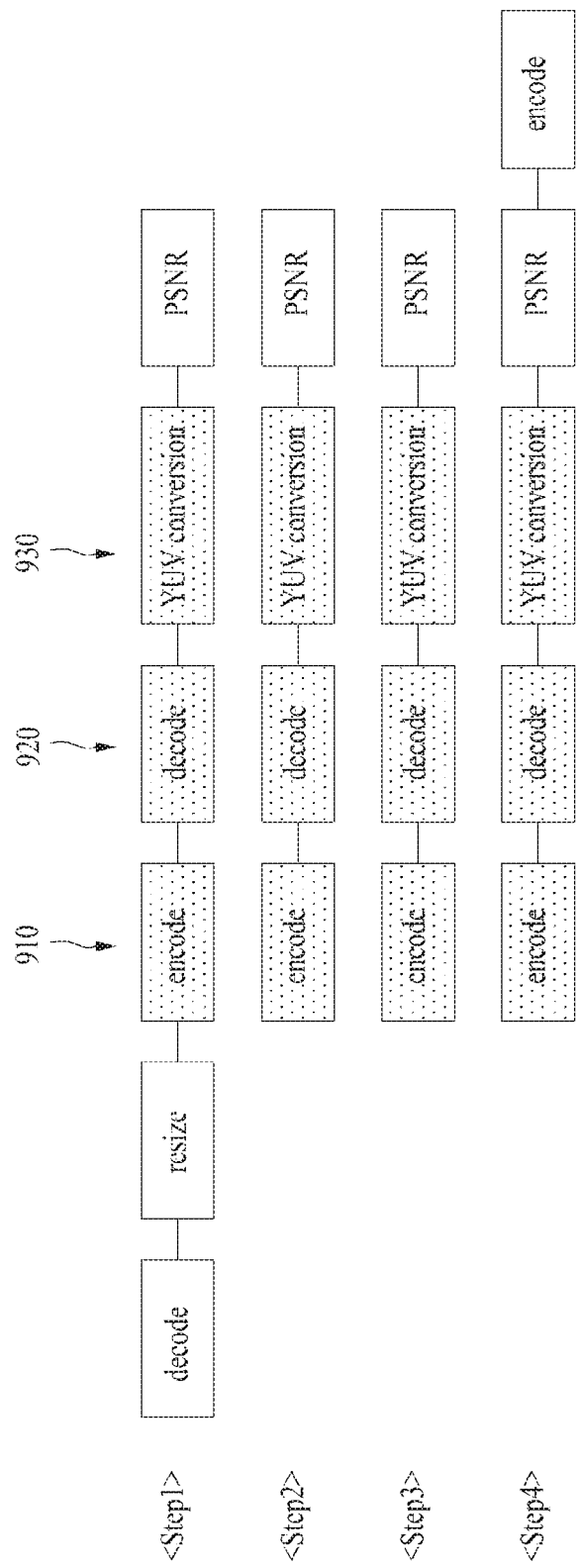

Since it is a process of encoding a single identical input image at each of different quality values, a portion of operations included in the encoding process 910, the decoding process 920, and the YUV conversion process 930 may have the same result value as a previous encoding process as shown in FIG. 11. Accordingly, a quality search rate may be enhanced by removing one or more of the iterative operations among the plurality of operations included in the encoding process 910, the decoding process 920, and the YUV conversion process 930.

Figure 12:
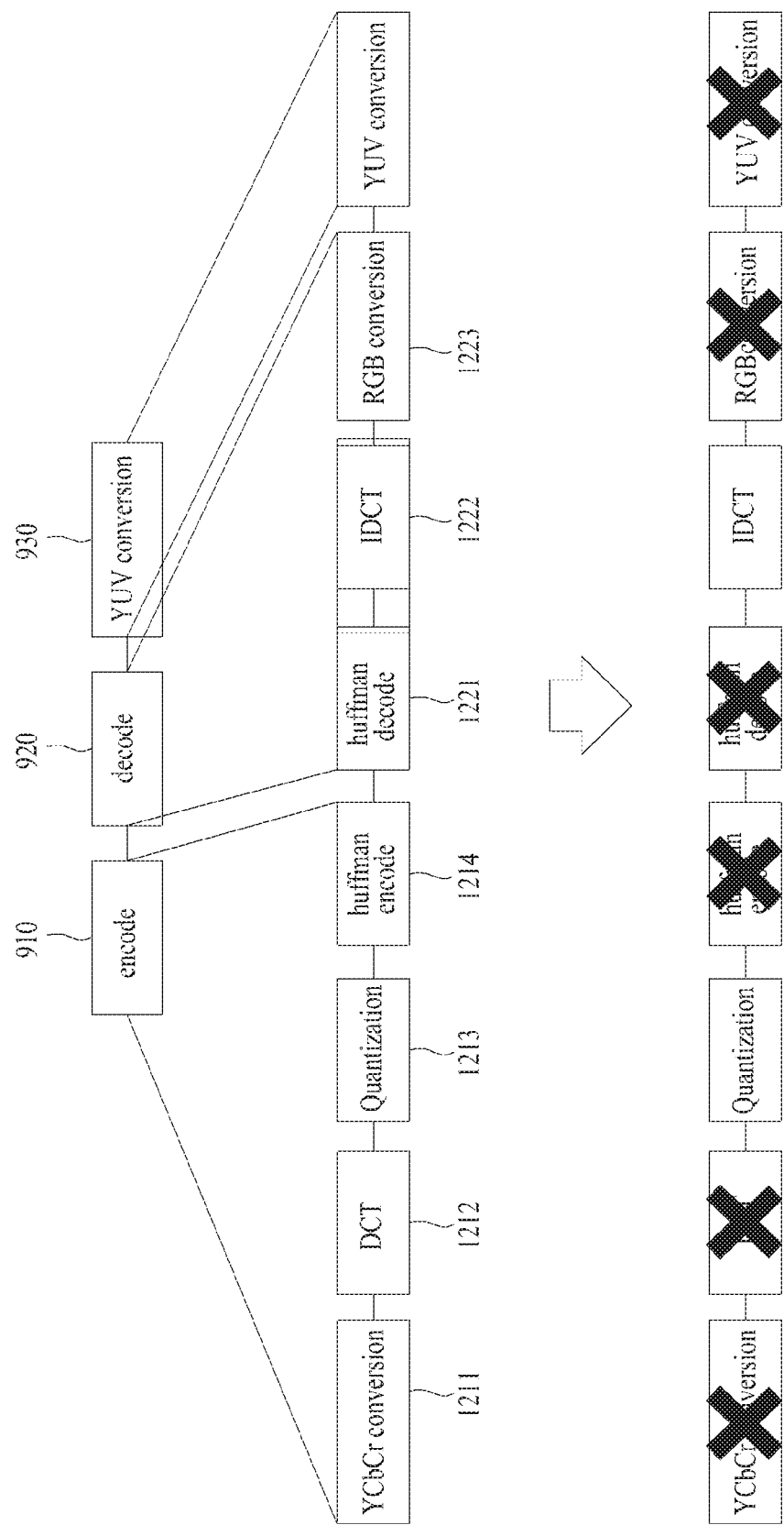

FIG. 12 illustrates an example of operations included in the encoding process 910, the decoding process 920, and the YUV conversion process 930, according to at least one example embodiment.

Referring to FIG. 12, the encoding process 910 includes an YCbCr conversion process 1211, a discrete cosine transform (DCT) process 1212, a quantization process 1213, and a Huffman encoding process 1214, according to the example embodiment, but is not limited thereto. The decoding process 920 includes a Huffman decoding process 1221, an inverse DCT (IDCT) process 1222, and an RGB conversion process 1223.

Here, the YCbCr conversion process 1211, the DCT process 1212, the Huffman encoding process 1214, the Huffman decoding process 1221, the RGB conversion process 1223, and the YUV conversion process 930 have the same operation values as a previous encoding process and thus, may be omitted from subsequent (e.g., future) encoding iterations instead of being repeatedly performed.

Figure 13:
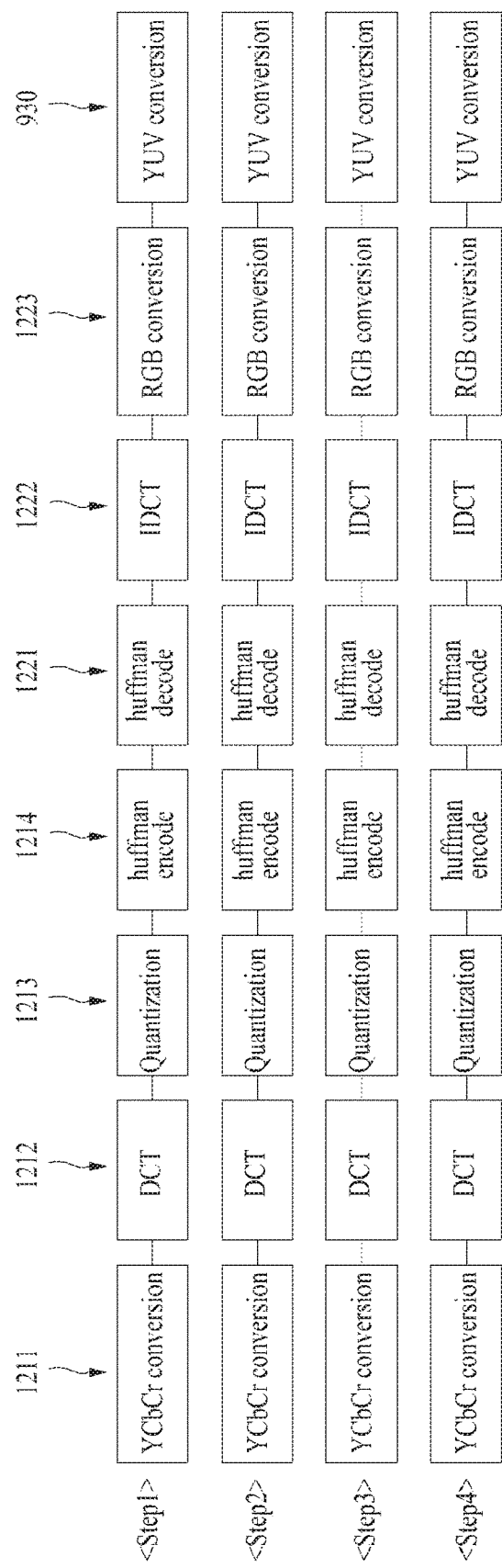

For example, when encoding is performed a total of four times (operation 1 through operation 4) as shown in FIG. 13 during a process of finding the improved and/or optimal quality that satisfies the target PSNR, each of the YCbCr conversion process 1211, the DCT process 1212, the quantization process 1213, the Huffman encoding process 1214, the Huffman decoding process 1221, the IDCT process 1222, the RGB conversion process 1223, and the YUV conversion process 930 is performed with respect to the input image four times.

Figure 14:
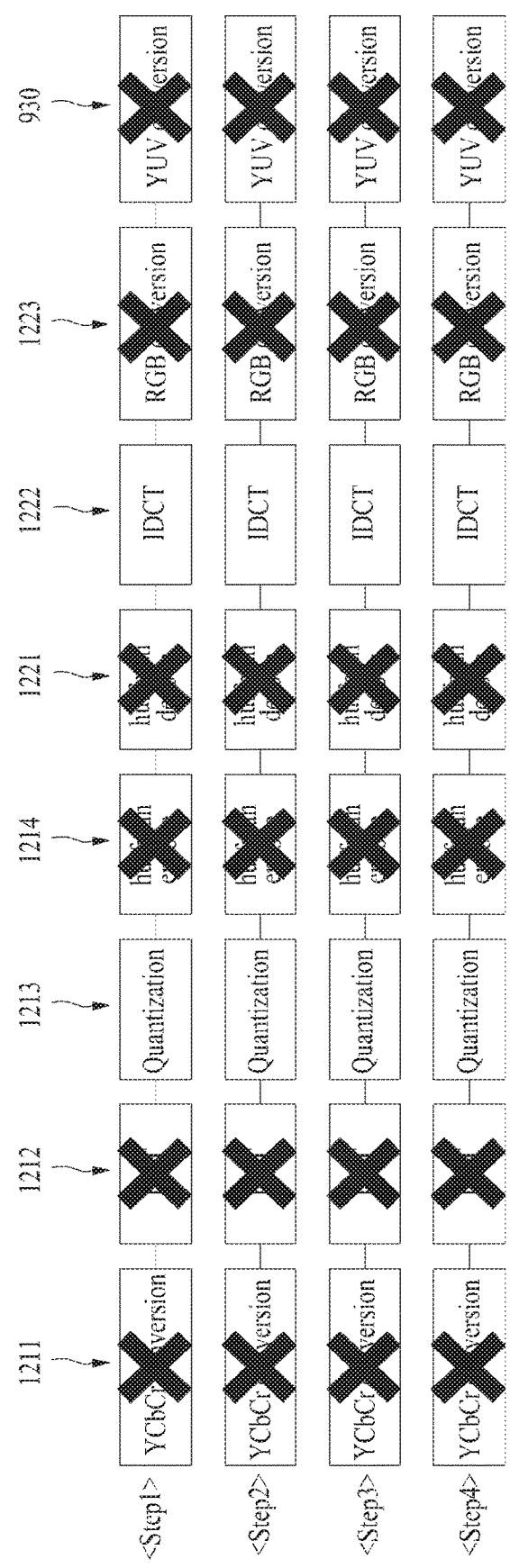

Referring to FIG. 14, operations corresponding to the YCbCr conversion process 1211, the DCT process 1212, the Huffman encoding process 1214, the Huffman decoding process 1221, the RGB conversion process 1223, and the YUV conversion process 930 may be removed from an encoding repeating process.

During an initial encoding process of the input image, all of the YCbCr conversion process 1211, the DCT process 1212, the quantization process 1213, the Huffman encoding process 1214, the Huffman decoding process 1221, the IDCT process 1222, the RGB conversion process 1223, and the YUV conversion process 930 may be performed. During a subsequent encoding process, an iterative operation may be omitted. Depending on the case, a previous operation result may be used even during the initial encoding process. Additionally, operations, for example, the Huffman encoding process 1214, the Huffman decoding process 1221, the RGB conversion process 1223, and the YUV conversion process 930, unnecessary for extracting the PSNR may be omitted from the initial operation.

As described above, by removing an unnecessary operation or an iterative operation from an iterative encoding process performed to find the improved and/or optimal quality for the quality desired and/or required for the input image, it is possible to enhance an encoding rate and a quality search rate.

The example embodiments are described with reference to designated functions and functional blocks exemplifying relationships therebetween. Boundaries of such functional blocks are arbitrarily defined for clarity of description and thus, if the designated functions and the relationship therebetween are appropriately performed, alternative boundaries may be defined.

Units and/or devices according to one or more example embodiments may be implemented using hardware, software, and/or a combination thereof. For example, hardware devices may be implemented using processing circuitry such as, but not limited to, a processor, a Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of compressing an input image, using at least one processor, the method comprising:

verifying, using the at least one processor, a desired compression quality value corresponding to an image compression protocol for compressing the input image, the input image being a still image frame;

calculating, using the at least one processor, a target peak signal-to-noise ratio (PSNR) value corresponding to the desired compression quality value;

determining, using the at least one processor, an optimal image quality value corresponding to the target PSNR value from an image quality range corresponding to the image compression protocol based on the desired compression quality value and a desired file size, a maximum value of the image quality range being set as the desired compression quality value, and a minimum value of the image quality range being set based on an average value determined using a plurality of optimal image quality values associated with a plurality of other images; and outputting, using the at least one processor, an image file encoded at the determined optimal image quality value as a compressed file of the input image.

2. The method of claim 1, wherein
a minimum value of the image quality range is set as an image quality value that is at least a factor of two lower than the desired compression quality value.

3. The method of claim 1, wherein the determining of the optimal image quality value comprises determining the optimal image quality value through a binary search on the image quality range.

4. The method of claim 1, wherein
the target PSNR is set as a numerical value; and
the determining of the optimal image quality value comprises:
  encoding the input image using at least one of a plurality of quality values corresponding to the image quality range,
  extracting a PSNR from each of the at least one encoded images, and
  determining, as the optimal image quality value, the quality value associated with the extracted PSNR that is greater than, or equal to, the target PSNR.

5. The method of claim 1, wherein
the target PSNR is set as a numerical range; and
the determining of the optimal image quality value comprises:
  encoding the input image using at least one of a plurality of quality values corresponding to the image quality range,
  extracting a PSNR from each of the at least one encoded images, and
  determining, as the optimal image quality value, the quality value associated with the extracted PSNR that corresponds to the target PSNR numerical range.

6. The method of claim 1, wherein the determining of the optimal image quality value comprises:
  encoding the input image at a maximum value of the image quality range;
  decoding the image encoded at the maximum value;
  calculating an average value of the image quality range based on the maximum value and a minimum value of the image quality range;
  encoding the input image at the average value;
  decoding the image encoded at the average value;
  extracting a PSNR from the decoded image encoded at the maximum value and the decoded image encoded at the average value; and
  determining whether the average value is the optimal image quality value based on whether the extracted PSNR is greater than, or equal to, the target PSNR.

7. The method of claim 6, wherein the determining of the optimal image quality value further comprises:
  changing the minimum value of the image quality range to the average value;
  determining whether the extracted PSNR is less than the target PSNR, and based on the results of the determining,
    calculating an updated average value of the image quality range based on the maximum value and the changed minimum value of the image quality range;
    encoding the input image at the updated average value;
    decoding the image encoded at the updated average value; and
    extracting an updated PSNR from the decoded image encoded at the maximum value and the decoded image encoded at the updated average value.

8. The method of claim 5, further comprising:
iteratively calculating, using the at least one processor, whether repeating at least one of the encoding the input image, extracting the PSNR from the at least one encoded images, and the determining the quality value associated with the extracted PSNR, provides a result which is equal to the result a previous encoding; and
wherein the determining of the optimal image quality value includes iteratively performing one or more of the encoding the input image, the extracting the PSNR from the at least one encoded images, and the determining the quality value associated with the extracted PSNR, based on the results of the calculating.

9. The method of claim 5, wherein the determining of the optimal image quality value includes iteratively performing one or more of the encoding the input image using at least one of a plurality of quality values corresponding to the image quality range, the extracting the PSNR from the at least one encoded images, and the determining the quality value associated with the extracted PSNR.

10. A non-transitory computer-readable recording medium storing computer-executable instructions, which when executed by at least one processor, causes the at least one processor to perform a method comprising:
  verifying a desired compression quality value corresponding to an image compression protocol for compressing an input image, the input image being a still image frame;
  calculating, using the at least one processor, a target peak signal-to-noise ratio (PSNR) value corresponding to the desired compression quality value;
  determining an optimal image quality value corresponding to the target PSNR from an image quality range corresponding to the image compression protocol based on the desired compression quality value and a desired compressed image file size, a maximum value of the image quality range being set as the desired compression quality value, and a minimum value of the image quality range being set based on an average value determined using a plurality of optimal image quality values associated with a plurality of other images; and
  outputting an image file encoded at the determined optimal image quality value as a compressed file of the input image.

11. A system comprising:
a memory having computer readable instructions stored thereon; and at least one processor configured to execute the computer readable instructions to, verify a desired compression quality value corresponding to an image compression protocol required for compressing an input image, the input image being a still image frame;

calculate a target peak signal-to-noise ratio (PSNR) value corresponding to the desired compression quality value;

determine an optimal image quality value corresponding to the target PSNR from a set image quality range corresponding to the image compression protocol based on the desired compression quality value and a desired compressed image file size, a maximum value of the image quality range being set as the desired compression quality value, and a minimum value of the image quality range being set based on an average value determined using a plurality of optimal image quality values associated with a plurality of other images; and output an image file encoded at the optimal image quality value as a compressed file of the input image.

12. The system of claim 11, wherein the at least one processor is further configured to:

encode the input image using at least one of a plurality of quality values corresponding to the image quality range;

extract a PSNR from each of the at least one encoded images; and determine, as the optimal image quality value, the quality value associated with the extracted PSNR that corresponds to a numerical value or a numerical range corresponding to the target PSNR.

13. The system of claim 11, wherein the at least one processor is further configured to:

encode the input image at a maximum value of the image quality range;

decode the image encoded at the maximum value;

calculate an average value of the image quality range based on the maximum value and a minimum value of the image quality range;

encode the input image at the average value;

decode the image encoded at the average value;

extract a PSNR from the decoded image encoded at the maximum value and the decoded image encoded at the average value; and determine whether the average value is the optimal image quality value based on whether the extracted PSNR is greater than, or equal to, the target PSNR.

14. The system of claim 13, wherein the at least one processor is further configured to:

change the minimum value of the image quality range to the average value;

determine whether the extracted PSNR is less than the target PSNR, and based on the results of the determining;

calculate an updated average value of the image quality range based on the maximum value and the changed minimum value of the image quality range;

encode the input image at the updated average value;

decode the image encoded at the updated average value; and extract an updated PSNR from the decoded image encoded at the maximum value and the decoded image encoded at the updated average value.

15. The system of claim 12, wherein the at least one processor is further configured to:

iteratively calculate whether repeating at least one of the encoding the input image, extracting the PSNR from the at least one encoded images, and the determining the quality value associated with the extracted PSNR, provides a result which is equal to the result of a previous encoding; and wherein the determining of the optimal image quality value includes iteratively performing one or more of the encoding the input image, the extracting the PSNR from the at least one encoded images, and the determining the quality value associated with the extracted PSNR, based on the results of the calculating.

16. The system of claim 12, wherein the determining of the optimal image quality value includes iteratively performing one or more of the encoding the input image using at least one of a plurality of quality values corresponding to the image quality range, the extracting the PSNR from the at least one encoded images, and the determining the quality value associated with the extracted PSNR.

17. An apparatus for compressing image files comprising:

a memory having computer readable instructions stored thereon; and at least one processor configured to execute the computer readable instructions to, receive an input image to be compressed according to a desired compression quality setting corresponding to an image compression protocol, the input image being a still image frame;

calculate a target peak signal-to-noise ratio (PSNR) value corresponding to the desired compression quality value;

determine an improved PSNR to use for encoding the input image based on the target PSNR corresponding to the desired compression quality setting and a desired compressed image file size;

set an image quality value range corresponding to the image compression protocol, the image quality value range including a high range value and a low range value, the high range value being set as the desired compression quality setting, and the low range value being set based on an average value determined using a plurality of optimal image quality values associated with a plurality of other images;

encode the input image using the high range value as a first encoded image;

extract a first PSNR from the first encoded image;

calculate an improved compression quality setting corresponding to the image compression protocol based on the image quality value range, the desired compressed image file size, and the first PSNR; and convert the input image to a compressed image using the calculated improved compression quality setting.

18. The apparatus of claim 17, wherein the setting the image quality value range includes:

setting the low range value to at least one of an experimentally determined value.

* * * * *